United States Patent
Samejima et al.

(10) Patent No.: US 9,028,737 B2
(45) Date of Patent: May 12, 2015

(54) METHOD FOR PRODUCING RESIN MOLDED ARTICLE BY INJECTION MOLDING, AND INJECTION MOLDING DEVICE

(75) Inventors: Masakuni Samejima, Makinohara (JP); Shinobu Suzuki, Kikugawa (JP)

(73) Assignee: Yazaki Corporation, Tokyo (JP)

( * ) Notice: Subject to any disclaimer, the term of this patent is extended or adjusted under 35 U.S.C. 154(b) by 137 days.

(21) Appl. No.: 13/702,401

(22) PCT Filed: Jun. 7, 2011

(86) PCT No.: PCT/JP2011/063055
§ 371 (c)(1),
(2), (4) Date: Dec. 6, 2012

(87) PCT Pub. No.: WO2011/155493
PCT Pub. Date: Dec. 15, 2011

(65) Prior Publication Data
US 2013/0087944 A1    Apr. 11, 2013

(30) Foreign Application Priority Data

Jun. 7, 2010 (JP) ................................ 2010-130001

(51) Int. Cl.
*B29C 45/14* (2006.01)
*H01R 43/24* (2006.01)

(52) U.S. Cl.
CPC ..... *B29C 45/14065* (2013.01); *B29C 45/14336* (2013.01); *B29C 45/14418* (2013.01); *B29C 45/14639* (2013.01); *H01R 43/24* (2013.01)

(58) Field of Classification Search
None
See application file for complete search history.

(56) References Cited

U.S. PATENT DOCUMENTS

| 5,182,032 A | * | 1/1993 | Dickie et al. | 249/91 |
| 5,659,246 A | * | 8/1997 | Togo et al. | 324/207.15 |
| 5,761,805 A | * | 6/1998 | Guyer | 29/883 |

(Continued)

FOREIGN PATENT DOCUMENTS

| JP | 2005104072 A | 4/2005 |
| JP | 2007136868 A | 6/2007 |

(Continued)

OTHER PUBLICATIONS

International Search Report (PCT/ISA/210) dated Aug. 16, 2011 issued by the International Searching Authority in counterpart International Application No. PCT/JP2011/063055.

(Continued)

*Primary Examiner* — Edmund Lee
(74) *Attorney, Agent, or Firm* — Sughrue Mion, PLLC

(57) ABSTRACT

Provided is a technology with which, when producing a resin molded article, the inside of which is provided with an insert component such as a terminal fitting, it is possible to prevent the insert component from being exposed at an inappropriate position, and to ensure the desired positional accuracy. In an injection molding device, the accuracy of the position of a terminal is improved by allowing a core-back mold to move after a terminal, which is an insert component, has been inserted in a terminal tip holding section of a slide mold. By allowing the core-back mold to move by only a prescribed amount prior to injection molding, a resin wall is formed between the core-back mold and the terminal. The inappropriate exposure and shorting of and the adhesion of foreign substances to, and the like, the terminal can thus be prevented.

4 Claims, 8 Drawing Sheets

(56) References Cited

U.S. PATENT DOCUMENTS

| | | | | |
|---|---|---|---|---|
| 5,823,797 | A | * | 10/1998 | Sugiyama .................... 439/76.1 |
| 5,926,952 | A | * | 7/1999 | Ito .................................. 29/883 |
| 6,076,258 | A | * | 6/2000 | Abe ............................... 29/883 |
| 6,837,746 | B2 | * | 1/2005 | Okamoto ..................... 439/606 |
| 8,357,015 | B2 | * | 1/2013 | Kohmura et al. ............. 439/736 |
| 8,465,270 | B2 | * | 6/2013 | Wang et al. ................... 425/117 |
| 2008/0012173 | A1 | * | 1/2008 | Asao ............................ 264/255 |
| 2010/0255732 | A1 | * | 10/2010 | Kohmura et al. .......... 439/733.1 |

FOREIGN PATENT DOCUMENTS

| | | |
|---|---|---|
| JP | 2008018633 A | 1/2008 |
| JP | 2009066858 A | 4/2009 |

OTHER PUBLICATIONS

Written Opinion (PCT/ISA/237) of the International Searching Authority dated Aug. 16, 2011 issued in counterpart International Application No. PCT/JP2011/063055.

* cited by examiner

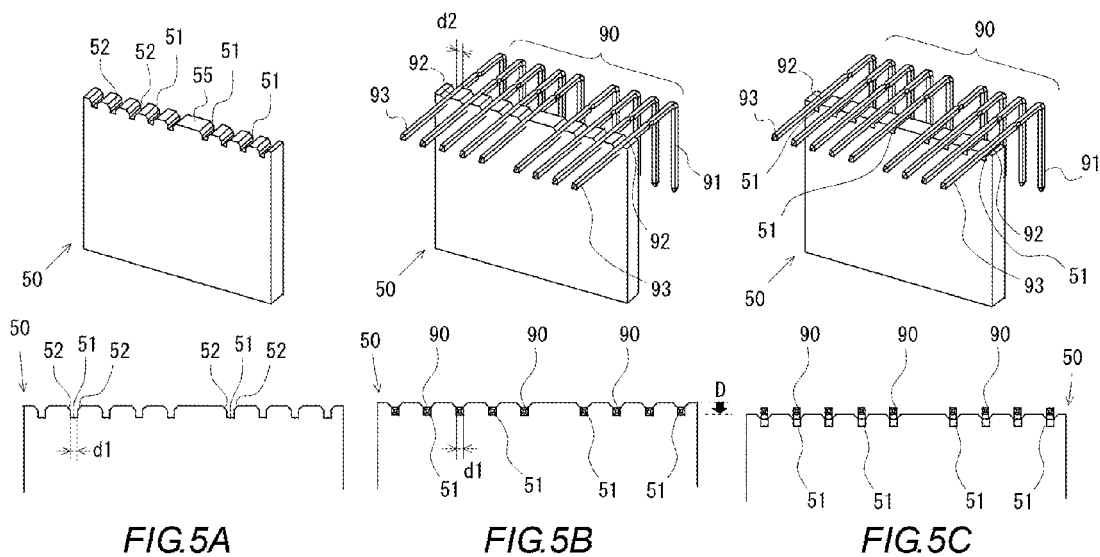

METHOD FOR PRODUCING RESIN MOLDED ARTICLE BY INJECTION MOLDING, AND INJECTION MOLDING DEVICE

TECHNICAL FIELD

The present invention relates to a method for producing a resin molded article by injection molding, and an injection molding device.

BACKGROUND ART

There are known injection molding techniques using a mold as techniques for producing a resin molded article. As one of such injection molding techniques, a core-back injection molding is known and universally used. In the core-back injection molding, a resin containing a foaming agent (e.g., a gas or chemical foaming agent) is injected/filled in a mold and then the mold is opened by a prescribed degree, so that the resin is foamed. Specifically, according to the core-back injection molding, a core of the mold is moved such that a cavity in the mold can be expanded. Types of the core-back injection molding include: a core-back injection molding employing an operation of a platen, a core-back injection molding employing a movement of a taper-shaped pressure receiving block, a core-back injection molding employing a movement of a movable core-back plate capable of receiving a mold clamping pressure; injection pressure, and the like.

In FIG. 9, a device (i.e., a molding machine 1) intended to enhance accuracies of velocity control or stop position control in a core-back injection molding is shown. In the molding machine 1, one or two more fixed molds 4 and movable molds 3, which are of the same number as that of the fixed molds 4, are arranged to face each other, and each set of the fixed molds 4 and the movable molds 3 is clamped. Then, all of the movable molds 3 are opened from the opposing fixed molds 4 by moving them by a prescribed amount, and a pressure receiving block 8 removably mounted on each of the fixed molds 4 is removed from the respective fixed molds 4. Next, the fixed molds 4 are moved by a prescribed amount in the mold-opening direction by servomotor control or hydraulic pressure control.

PRIOR ART DOCUMENT

Patent Documents

Patent Document 1: JP-A-2005-104072

SUMMARY OF INVENTION

Problems to be Solved by Invention

However, for a resin molded article having therein an insert component, such as a terminal fitting, there are problems in that an inappropriate exposure, a poor positional accuracy and a deformation of the terminal fitting and the like can be caused. Specifically, when the terminal fitting and the like are exposed, the shorting and the adhesion of foreign substances are likely to occur. Also, if the positional accuracy of the terminal fitting is poor upon molding, the deformation thereof can occur and cause a product defect. The technology described in Patent document 1 doesn't consider such an insert component at all and thus is not applied as it is. Accordingly, another technology is required.

Accordingly, the present invention has been made keeping in mind the above problems, and an object of the present invention is to provide a technique capable of solving the problems.

Means for Solving Problems

According to one aspect of the present invention, there is provided a method for producing a resin molded article, using an injection molding device including a fixed mold, a movable mold and a slide mold, and adapted to inject a resin material into a space defined by the molds, wherein the resin molded article includes a terminal fitting as an insert component. The method for producing the resin molded article includes: a terminal fitting positioning step of positioning the terminal fitting into a first terminal inserting means and into a terminal disposing groove, wherein the first terminal inserting means is provided in the fixed mold to allow a first end of the terminal fitting to be inserted therein, and the terminal disposing groove is formed on an outer surface of a core-back mold, which is provided in the fixed mold disposed so as to enable a core-back operation; a movable mold positioning step of moving the movable mold to a prescribed location after the terminal fitting has been positioned; a slide mold positioning step of moving the slide mold to a prescribed location in a space defined by the fixed mold and the movable mold, such that a second end of the terminal fitting, which is opposite to the first end can be inserted into a second terminal inserting means provided on the slide mold; a core-backing step of moving the core-back mold by a prescribed amount in a direction away from the terminal fitting; and a resin material injecting step of injecting and filling with the resin material in the space defined by the fixed mold, the movable mold and the slide mold.

Also, the terminal fitting may have a shape bent at approximately right angle and the bent portion thereof is inserted into the first terminal inserting means, and an opening portion of the first terminal inserting means, in which the first end is inserted may not be covered with the moveable mold when the movable mold is positioned in the movable mold positioning step, and the terminal fitting may be covered with the resin material in the resin material injecting step.

According to another aspect of the present invention, there is provided an injection molding device including a fixed mold, a movable mold and a slide mold, wherein a resin material is injected and filled in a space defined by the fixed mold, the movable mold, and the slide mold. In the injection molding device, the fixed mold is provided with a first terminal inserting means adapted to allow a first end of a terminal fitting to be inserted therein, and a core-back mold which is disposed so as to enable a core-back operation, wherein the terminal fitting can be disposed in the first terminal inserting means and a terminal disposing grooves formed on an outer surface of the core-back mold. The core-back mold is movable by a prescribed amount in a direction away from the terminal fitting, and the slide mold is provided with a second terminal inserting means adapted to allow a second end of the terminal fitting, which is opposite to the first end to be inserted therein, when the slide mold is moved to a prescribed location in a space defined by the fixed mold and the movable mold.

In addition, the terminal fitting may have a shape bent at approximately right angle and the bent portion thereof is inserted into the first terminal inserting means, and wherein an opening portion of the first terminal inserting means, in which the first end is inserted, may not be covered with the moveable mold when the movable mold is moved to a prescribed location, and the terminal fitting may covered with the resin material injected.

Advantageous Effects of Invention

According to the present invention, there is provided a technology in which, when producing a resin molded article having therein an insert component such as a terminal fitting, it is possible to prevent the insert component from being exposed at an inappropriate position, and to ensure the positional accuracy thereof as desired.

BRIEF DESCRIPTION OF DRAWINGS

FIGS. 1A and 1B are views schematically showing a configuration of a connecting terminal device according to an illustrative embodiment of the present invention, wherein FIG. 1A is a perspective view thereof and FIG. 1B is a sectional view thereof.

FIGS. 5A to 5C are views showing an exterior shape of a core-back mold according to the embodiment of the present invention.

FIGS. 6A and 6B are views showing the connecting terminal device together with the core-back mold when the connecting terminal device has been formed according to the embodiment of the present invention, wherein FIG. 6A is a perspective view thereof and FIG. 6B is a sectional view thereof.

EMBODIMENTS OF INVENTION

A mode for implementing the present invention (hereinafter, referred to "embodiment") will be now described in detail with reference to the accompanying drawings. The embodiment relates to a core-back injection molding, in which molding is performed while moving a prescribed mold in injection molding of a resin molded article. Accordingly, the following description will be focused on a movement of the mold for a core-back operation in injection molding.

Figure 1A:
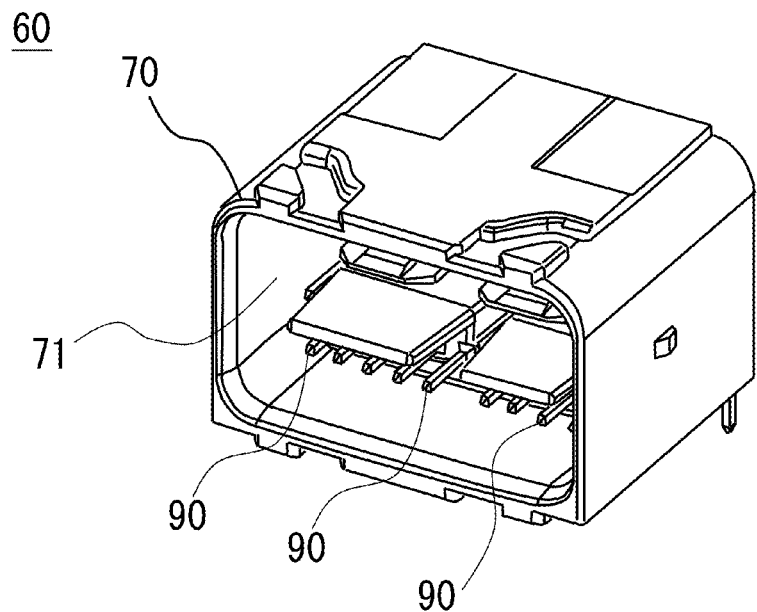
Figure 1B:
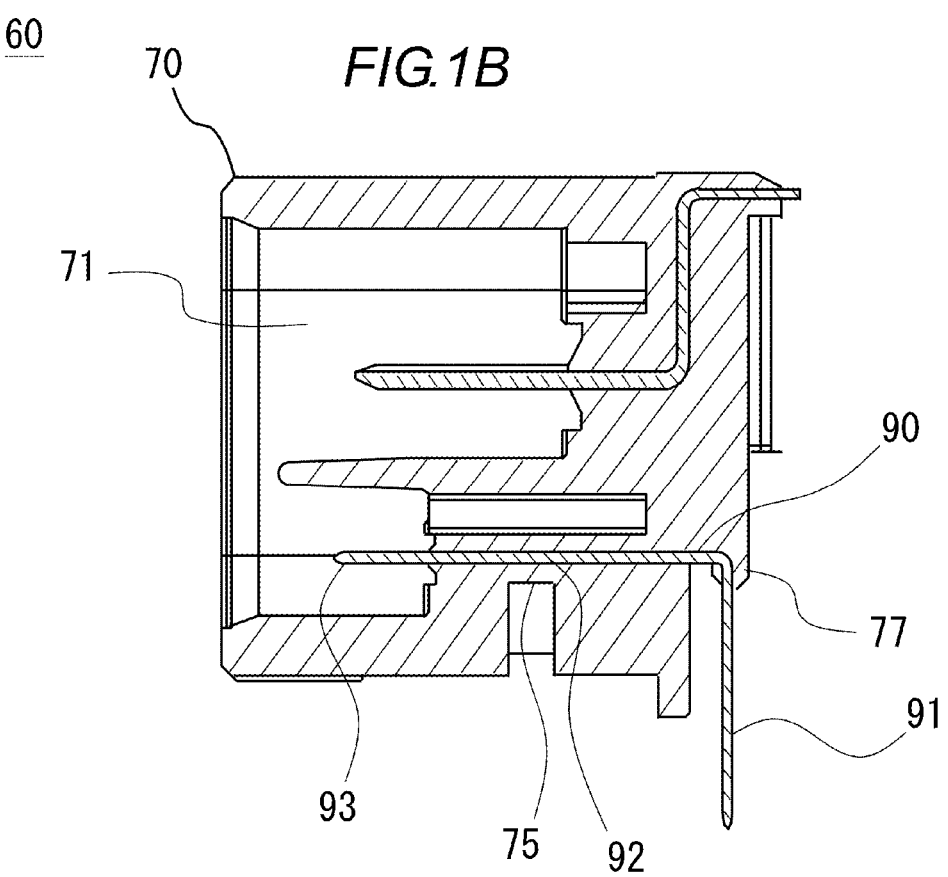

FIGS. 1A and 1B are views schematically showing a configuration of a connecting terminal device 60 according to the embodiment of the present invention, wherein FIG. 1A is a perspective view thereof and FIG. 1B is a sectional view thereof. The connecting terminal device 60 is used, for example, in an ECU case of a motor vehicle and the like, and is fitted in and connected to other corresponding connecting device. As shown, the connecting terminal device 60 includes a resin-made terminal case 70 having a case cavity 71 formed therein, and terminals 90 as an insert component. Herein, there is illustrated a structure in which the number of the terminals 90 is nine. Each of the terminals 90 has a shape in which a rod-shaped conductive metal is bent at the right angle along its way. The terminals 90 are embedded together in the terminal case 70 when the terminal case 70 is molded, and are disposed at prescribed locations. In the terminals 90, a terminal outside connecting section 91, which corresponds to a portion extending in a vertical direction, is exposed and extended from a back side rib-shaped section 77 formed on a back side of the terminal case 70 and connected to an exterior circuit board and the like. In addition, a terminal inside connecting section 92, which corresponds to a portion extending in a horizontal direction, has a terminal tip 93 exposed into the case cavity 71 by a prescribed length. Hereinafter, a technique for producing the connecting terminal device 60 will be described.

Figure 2:
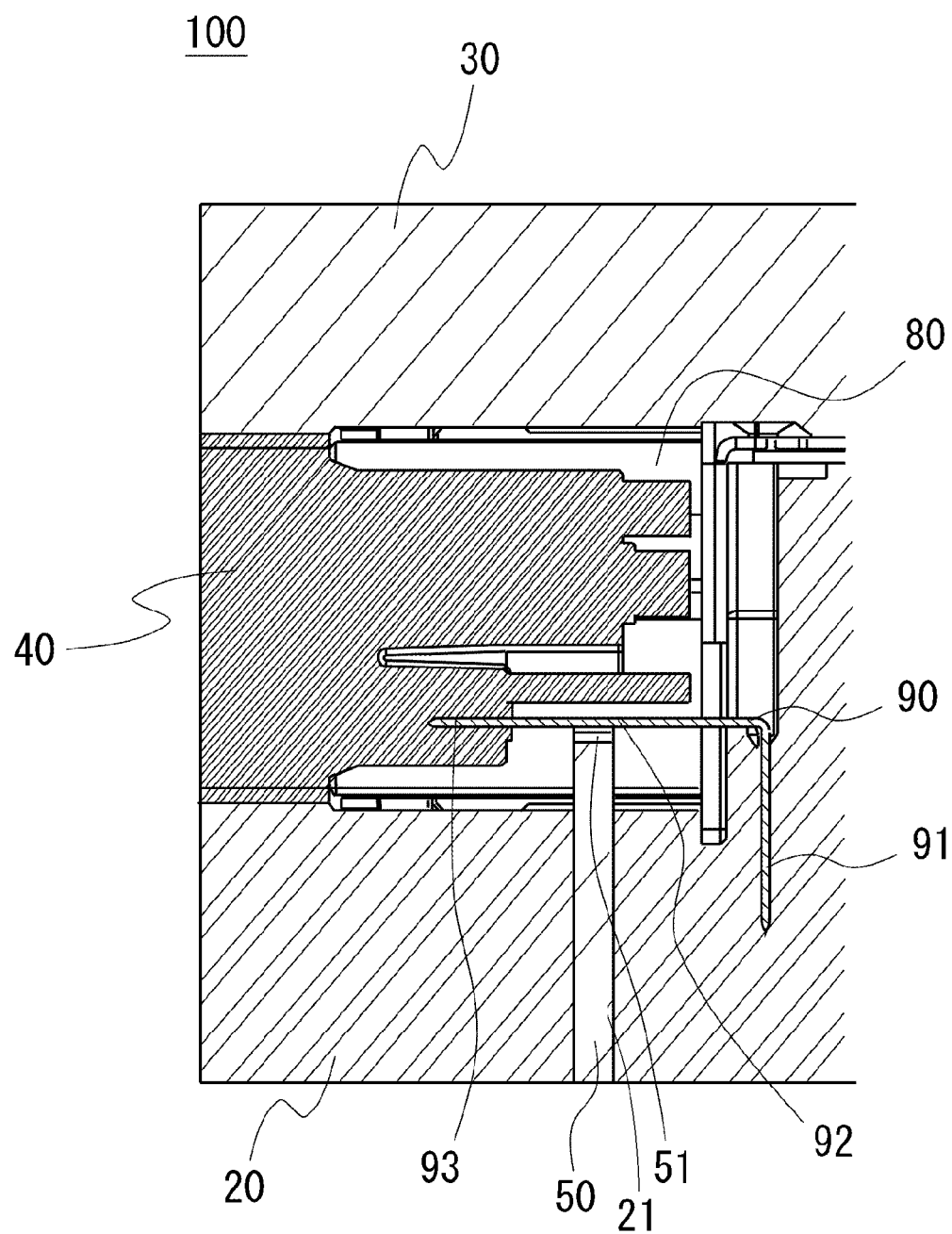
FIG. 2 is a view schematically showing a sectional structure of an injection molding device according to an embedment of the present invention.

FIG. 2 is a view schematically showing a sectional structure of an injection molding device 100. Herein, there is shown a sectional structure focused on a mold, and therefore a resin injection device (such as a hot runner) or moving means for the mold (such as a hydraulic cylinder) is omitted. In addition, reference numerals in the following drawings will be designated only to representatives of each component, and thus will be properly omitted.

As shown, the injection molding device 100 includes a fixed mold 20, a movable mold 30, a slide mold 40, and a core-back mold 50. In this case, the fixed mold 20 is disposed at a lower position, and the movable mold 30 is disposed at an upper position to face the fixed mold 20. In addition, the slide mold 40 is inserted from the left into a space defined by the fixed mold 20 and the movable mold 30. Also, the core-back mold 50 is movably disposed in a core-back mounting section 21 of the fixed mold 20. Also, terminals 90, which are insert components, are disposed at prescribed locations. Then, a resin is injected into a mold cavity 80 and the core-back mold 50 is core-backed, thereby forming the terminal case 70 which is a resin molded article having a desired shape as shown in FIGS. 1A and 1B.

The detailed producing processes and the features of each component will be now described.

Figures 3A, 3B, 3C:
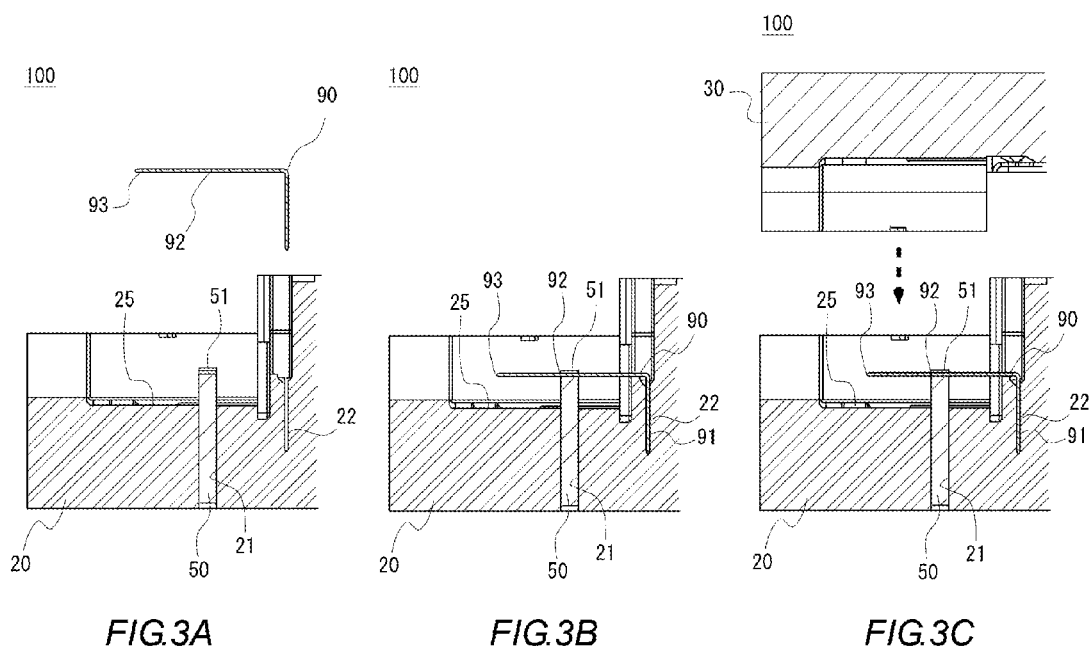
FIGS. 3A to 3C are views respectively showing one of steps for producing the connecting terminal device according to an embodiment of the present invention.

FIGS. 3A to 3C and 4A to 4C are views respectively showing steps for producing the connecting terminal device 60. As shown in FIG. 3A, the terminals 90 which are insert components are firstly mounted in the fixed mold 20. Specifically, a space of a prescribed shape vertically extending from a cavity surface 25 which is an upper surface of the fixed mold 20 is formed to communicate with the outside, thereby serving as the core-back mounting section 21. The shape of the space is approximately a rectangular parallelepiped shape, and is adapted to allow the core-back mold 50 to be movably disposed.

Now, the core-back mold 50 will be described. In FIGS. 5A to 5C, there is shown an exterior shape of the core-back mold 50. FIG. 5A shows only the core-back mold 50, FIG. 5B shows a state that the terminals 90 is disposed, and FIG. 5C shows a state that, after disposing the terminals 90, the core-back mold 90 is downwardly moved by a prescribed amount D as a core-back operation.

As shown, the core-back mold 50 has terminal holding grooves 51 formed in a shape to allow the terminal inside connecting sections 92 of the terminals 90 to be disposed therein. More particularly, the terminal holding grooves 51 are formed at a prescribed depth in a front-and-back direction on an upper surface of the core-back mold 50. As shown in FIG. 5B, a width d1 of the terminal holding grooves 51 is approximately equal to a width d2 of the terminals 90 (i.e. the terminal outside connecting sections 91), and is adapted to allow the terminal inside connecting sections 92 to be smoothly disposed. In addition, an upper opening portion of the terminal holding grooves is provided with a taper-shaped inclined surface 52 formed to be widened outward. Also, the depth of the terminal holding grooves 51 or the shape (such as a size or an opening angle) of the inclined surface 52 needs to be designed in consideration of the flowability of resin and the like, when the core-back mold 50 is moved and the resin is molded as described below.

The description with reference to FIGS. 3A to 3C will be returned. When the terminals 90 are disposed in the fixed mold 20, the terminal outside connecting sections 91 are inserted into insert grooves 22 formed on the right side of the fixed mold 20. The insert grooves 22 are formed in a shape corresponding to a shape of the terminal outside connecting sections 91.

Also, the core-back mold 50 is disposed at a prescribed position in the core-back mounting section 21 of the fixed mold 20. In addition, since the insert grooves 22 are formed in the mold cavity 20, upper sides of the insert grooves 22, i.e., bended portions of the terminals 90, are covered with resin, upon resin molding, and thus the back side rib-shaped section 77 is formed by such resin molding.

Also, after the entire quantity (in case of the present embodiment, nine) of the terminals 90 are appropriately disposed at prescribed locations as shown in FIGS. 3B and 5B, the movable mold 30 is moved to face the upper surface of the fixed mold 20 and thus is disposed at a prescribed location as shown in FIG. 3C.

Figures 4A, 4B, 4C:
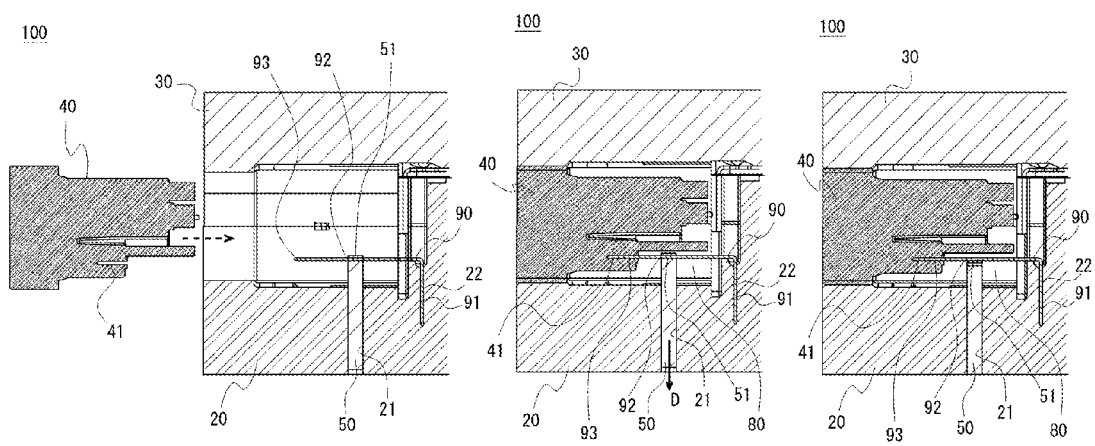
FIGS. 4A to 4C are views respectively showing one of steps for producing the connecting terminal device according to the embodiment of the present invention.

Next, as shown in FIG. 4A, the slide mold 40, which is a mold portion defining a shape of the case cavity 71 of the terminal case 70, is inserted at a prescribed location in a space defined between the fixed mold 20 and the movable mold 30 from left to right in the drawings. The slide mold 40 is provided with terminal tip holding sections 41 which provide a space allowing the terminal tips 93 to be inserted therein, such that the terminal tips 93 can be appropriately exposed by a prescribed length after resin molding. FIG. 4B shows a state that the slide mold 40 is inserted. In this time, since the terminal inside connecting sections 92 of the terminals 90 are disposed in the terminal holding grooves 51 of the core-back mold 50 such that the positional accuracy of the terminal tips 93 can be ensured, the terminal tips 93 can be inserted in the terminal tip holding sections 41. For a configuration in which the core-back mold 50 was not used, if the direction of the terminals 90 was misaligned, the slide mold 40 would bend or break the terminals 90 as the slide mold 40 was inserted, and accordingly defects were caused in the connecting terminal device 60 as a finished product. However, since the terminal holding grooves 51 of the core-back mold 50 can serve as a kind of guide as in the embodiment, the terminals 90 can be appropriately positioned, thereby preventing misalignment of the direction thereof.

Subsequently, when the slide mold 40 is inserted and appropriately disposed in a state shown in FIG. 4B, the core-back mold 50 is then downwardly moved by the prescribed amount D. FIG. 5C shows a relation between the core-back mold 50 and the terminals 90 when the core-back mold 50 is core-backed. In this time, since the terminal tips 93 are inserted and held in the slide mold 40 and also the terminal outside connection sections 91 are inserted and held in the inert grooves 22, the terminals 90 are held in a position-fixed state. Then, in a state of FIG. 4C, a molten resin material is injected into the mold cavity 80 which is a space defined by the fixed mold 20, the movable mold 30 and the slide mold 40.

Figure 6A:
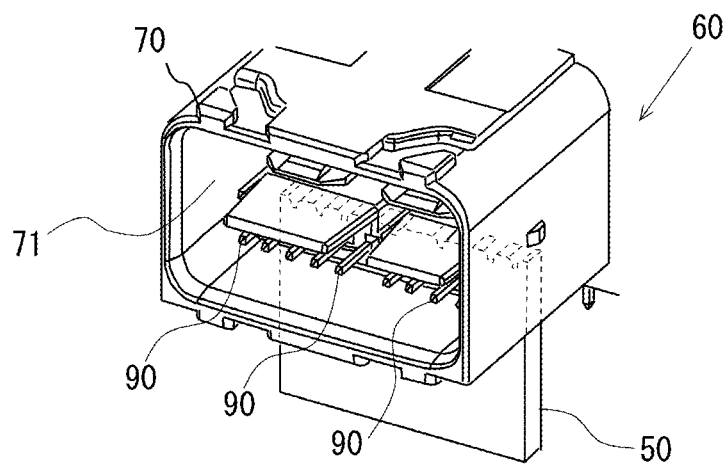
Figure 6B:
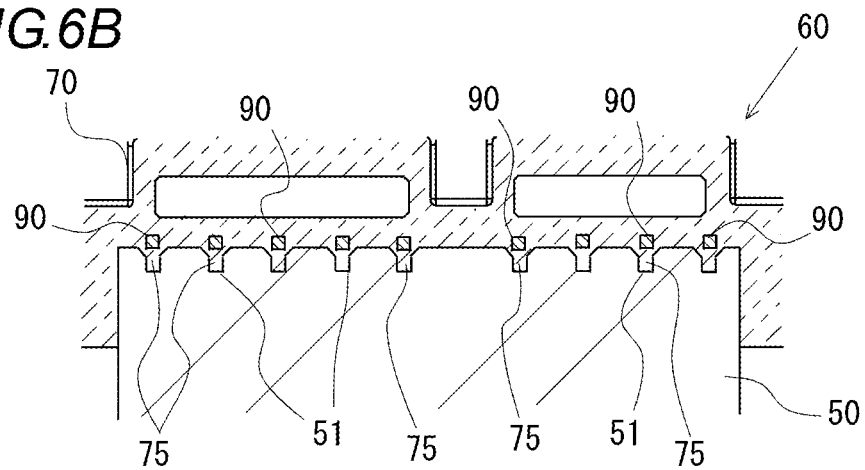

In FIGS. 6A and 6B, after the connecting terminal device 60 (i.e., the terminal case 70) has been formed, the connecting terminal device 60 together with the core-back mold 40 is shown. FIG. 6A is a perspective view, and FIG. 6B is a cross-sectional view of a region where the core-back mold 50 is disposed. Also, FIG. 7 is a sectional view showing the connecting terminal device 60 with the core-back mold 50 removed from the state shown in FIG. 6B.

Figure 7:
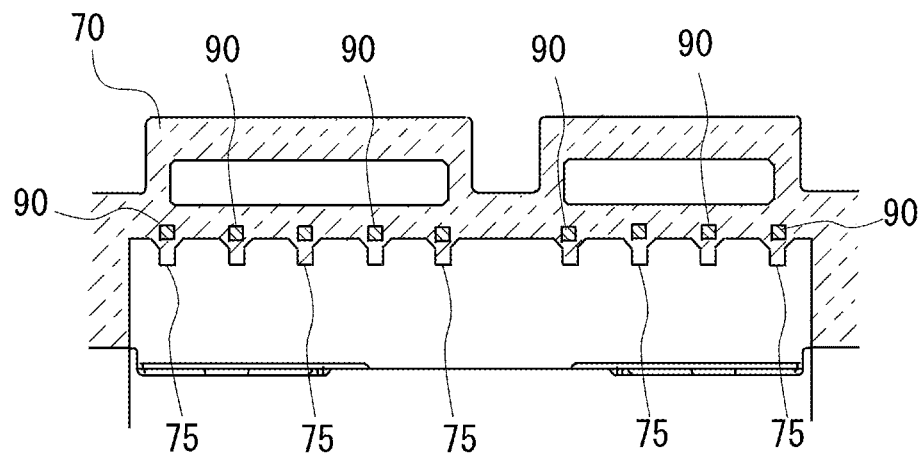
FIG. 7 is a sectional view showing the connecting terminal device with the core-back mold removed from the state shown in FIG. 6B according to the embodiment of the present invention.

As shown in FIG. 6B or 7, a resin wall 75 is formed in a portion provided as the core-back mold 50 is moved by the prescribed amount, i.e., between lower surfaces of the terminal inside connecting sections 92 of the terminals 90 and the terminal holding grooves 51. As a result of such a structure, the terminal inside connecting sections 92 are not inappropriately exposed, and also the function of protecting the terminal tips 93 is provided, thereby improving strength.

As set forth above, the producing processes of the present embodiment can be briefly summarized as the following. Namely, the associated producing method includes the steps of: positioning a terminal fitting, positioning a movable mold, positioning a slide mold, core-backing, and injecting a resin material. In the step of disposing the terminal fitting, the terminal 90 is disposed in the terminal holding groove 51 of the core-back mold 50 and in the insert groove 22 of the fixed mold 20. Then, the movable mold 30 is moved at a prescribed location as the step of disposing the movable mold, and also the slide mold 40 is inserted into a space defined between the fixed mold 20 and the movable mold 30 as the step of disposing the slide mold. In this time, the terminal tip 93 of the terminal 90 is inserted into the terminal tip holding section 41. Subsequently, the core-back mold 50 is downwardly moved by the prescribed amount D as the step of core-backing, and a resin is injected into the mold cavity 80 as the step of injecting the resin material, thereby completing the connecting terminal device 60 as shown in FIGS. 1A and 1B.

Figure 8:
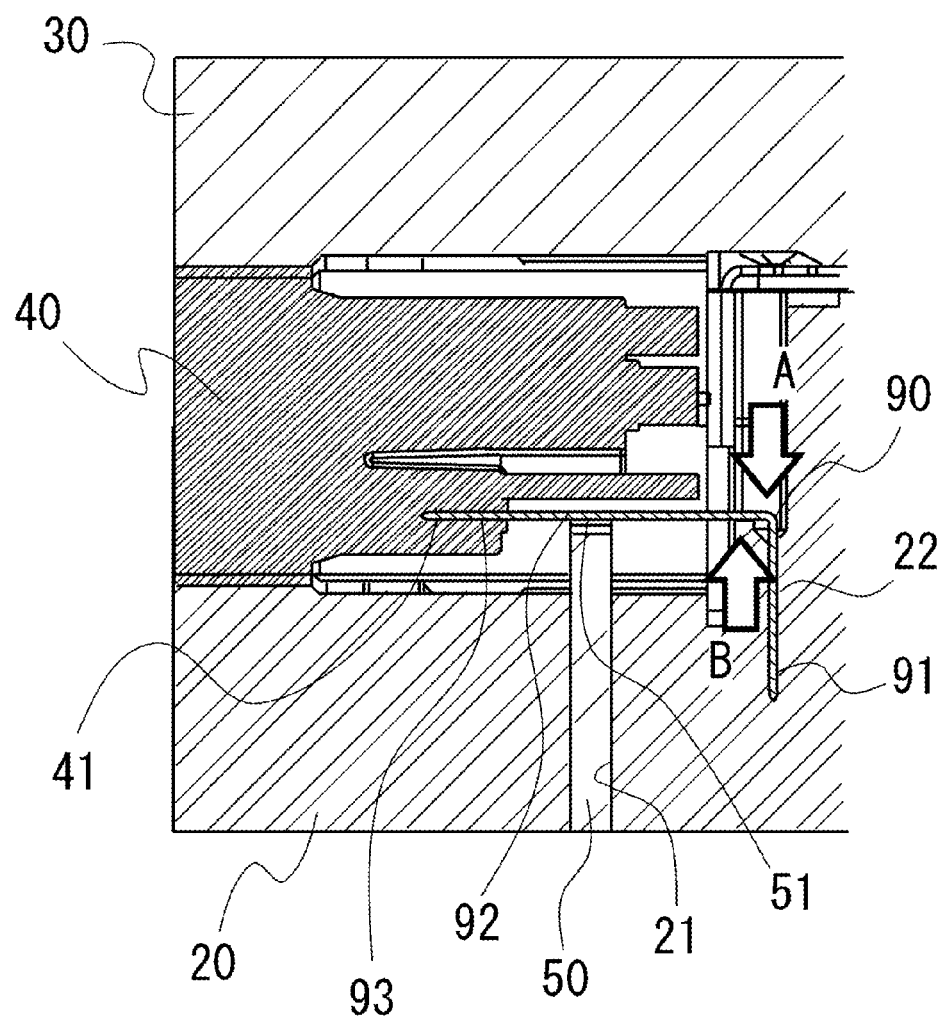
FIG. 8 is a view showing a sectional structure of the injection molding device, illustrating that, upon injecting of a resin, a back side rib-shaped section is pressed by the resin, according to the embodiment of the present invention.
Figure 9:
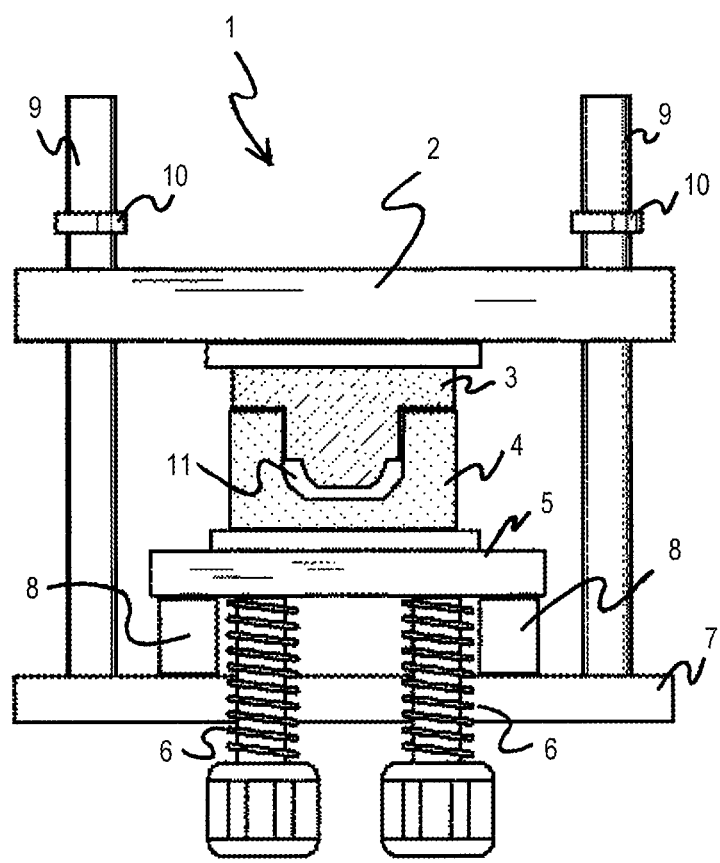
FIG. 9 is a view showing a core-back typed molding machine according to the related art.

According to the injection molding device 100 and the producing method as described above, timing for moving the core-back mold 50 is after the terminal 90 (i.e., the terminal tip 93), which is the insert component, is inserted into the terminal tip holding section 41 of the slide mold 40, thereby improving the positional accuracy of the terminal 90. Also, by moving the core-back mold 50 by the prescribed amount D before injection molding, the resin wall is formed between the core-back mold 50 and the terminal 90, thereby preventing the inappropriate exposure and shorting of the terminal 90 and the adhesion of foreign substances to the terminal 90, and the like. In addition, as shown in FIG. 8, the back side rib-shaped section 77 (see FIGS. 1A and 1B) is formed near to the bent portion of the terminal 90 on the back side of the terminal case 70 (i.e., an upper portion of the terminal 90), such that the terminal 90 can be pressed by the resin pressure upon injection molding (arrows A and B shown). As a result, the improved positional accuracy and deforming prevention of the terminal 90 can be achieved.

The present invention has been described hereinabove with reference to the embodiment. It should be apparent to those skilled in the art that the embodiment is illustrative and that various alternatives can be made to the components and the combination thereof described in the embodiment and still fall within the scope of the present invention.

Although the present invention has been described with referenced to the detailed and specific embodiment, it should be apparent to those skilled in the art that numerous changes and modifications can be made without departing the scope and spirit of the present invention.

This application claims the benefit of Japanese Patent Application Serial No. 2010-130001 filed Jun. 7, 2010, the entire contents of which are incorporated herein by reference.

INDUSTRIAL APPLICABILITY

According to the method for producing the resin molded article by injection molding and the injection molding device of the present invention, there is provided a technology in which, when producing a resin molded article having therein an insert component such as a terminal fitting, it is possible to prevent the insert component from being exposed at an inappropriate position, and to ensure the positional accuracy thereof as desired.

DESCRIPTION OF REFERENCE NUMERALS

100 Injection Molding Device
20 Fixed Mold
21 Core Mounting Section
22 Insert Groove
25 Cavity Surface
30 Movable Mold
40 Slide Mold
41 Terminal Tip Holding Section
50 Core-Back Mold
51 Terminal Holding Groove
52 Inclined Surface
60 Connecting Terminal Device
70 Terminal Case
71 Case Cavity
72 Resin Wall
77 Back Side Rib-Shaped Section
90 Terminal
91 Terminal Outside Connecting Section
92 Terminal Inside Connecting Section
93 Terminal Tip

The invention claimed is:

1. A method for producing a resin molded article by injecting a resin material into a space defined by a fixed mold, a movable mold and a slide mold, the resin molded article including a terminal fitting as an insert component, the method comprising:
   a terminal fitting positioning step of positioning the terminal fitting into a first terminal inserting section and into a terminal disposing groove, wherein the first terminal inserting section is provided in the fixed mold to allow a first end of the terminal fitting to be inserted therein, and the terminal disposing groove is formed on an outer surface of a core-back mold, which is provided in the fixed mold disposed so as to enable a core-back operation;
   a movable mold positioning step of moving the movable mold to a prescribed location after the terminal fitting is positioned;
   a slide mold positioning step of moving the slide mold to a prescribed location in a space defined by the fixed mold and the movable mold, such that a second end of the terminal fitting, which is opposite to the first end is inserted into a second terminal inserting section provided on the slide mold;
   a core-backing step of moving the core-back mold by a prescribed amount in a direction away from the terminal fitting; and
   a resin material injecting step of injecting and filling with the resin material in the space defined by the fixed mold, the movable mold, the slide mold, and the moved core-back mold.

2. The method according to claim 1,
   wherein the terminal fitting has a shape bent at approximately right angle and the bent portion thereof is inserted into the first terminal inserting section; and
   wherein an opening portion of the first terminal inserting section, in which the first end is inserted is not covered with the moveable mold when the movable mold is positioned in the movable mold positioning step, and the terminal fitting is covered with the resin material in the resin material injecting step.

3. An injection molding device comprising a fixed mold, a movable mold, and a slide mold, wherein a resin material is injected and filled in a space defined by the fixed mold, the movable mold and the slide mold,
   wherein the fixed mold is provided with a first terminal inserting section adapted to allow a first end of a terminal fitting to be inserted therein, and a core-back mold which is disposed so as to enable a core-back operation, wherein the terminal fitting can be disposed in the first terminal inserting section and a terminal disposing grooves formed on an outer surface of the core-back mold,
   wherein the core-back mold is movable by a prescribed amount in a direction away from the terminal fitting, and
   wherein the slide mold is provided with a second terminal inserting section adapted to allow a second end of the terminal fitting, which is opposite to the first end to be inserted therein when the slide mold is moved to a prescribed location in a space defined by the fixed mold and the movable mold.

4. The injection molding device according to claim 3,
   wherein the terminal fitting has a shape bent at approximately right angle and the bent portion thereof is inserted into the first terminal inserting section; and
   wherein an opening portion of the first terminal inserting section, in which the first end is inserted is not covered with the moveable mold when the movable mold is moved to a prescribed location, and the terminal fitting is covered with the resin material injected.

* * * * *